United States Patent [19]

Nelsen

[11] Patent Number: 4,539,356

[45] Date of Patent: Sep. 3, 1985

[54] POLYETHYLENE TEREPHTHALATE MOLDING COMPOSITION

[75] Inventor: Suzanne B. Nelsen, Bergenfield, N.J.

[73] Assignee: GAF Corporation, Wayne, N.J.

[21] Appl. No.: 661,743

[22] Filed: Oct. 17, 1984

[51] Int. Cl.$^3$ .......................... C08K 5/42; C08L 67/02
[52] U.S. Cl. ...................................... 524/166; 524/539
[58] Field of Search ................................. 524/166, 539

[56] References Cited

U.S. PATENT DOCUMENTS

| | | | |
|---|---|---|---|
| 3,565,852 | 2/1971 | Conix | 525/444 |
| 3,679,628 | 7/1972 | Brinkmann | 524/166 |
| 4,002,593 | 1/1977 | Jones | 523/340 |

FOREIGN PATENT DOCUMENTS 568444  1/1981  Japan .................... 524/166

*Primary Examiner*—C. Warren Ivy
*Attorney, Agent, or Firm*—Joshua J. Ward; Marilyn J. Maue

[57] ABSTRACT

Polyethylene terephthalate molding composition containing aliphatic glycol phthalate and derivatives of alkali metal taurate or isethionate.

8 Claims, No Drawings

POLYETHYLENE TEREPHTHALATE MOLDING COMPOSITION

BACKGROUND OF THE INVENTION

Polyethylene terephthalate (PET) is a well known resin for molding applications. Because of its partially crystalline structure, PET is particularly suitable for production of molded articles which are subjected to severe mechanical stress or exposed to severe heat. PET is frequently blended with various additives to improve properties such as impact strength, resistance to warping, flame resistance, thermal stability, etc. Mechanical properties of PET for molding purposes can generally be improved by the incorporation of reinforcing fibers such as glass fibers. The use of glass fibers for reinforcing PET molding composition is discussed for instance in U.S. Pat. No. 3,368,995.

PET crystallizes relatively slowly. This limits the utility of PET as a resin for the formation of articles by injection molding. Addition of nucleating agent such as talc reduces the crystallization time and allows PET to be molded more efficiently. Generally, however, very high mold temperatures are needed to produce acceptable parts in this manner. The use of mold temperatures in excess of about 130° C. is not generally considered practical because most molds are heated with water and only reach temperatures of 85°–110° C. For this reason, molding temperatures below about 110° C. are generally preferred. Fast molding times are considered desirable as an economic consideration. For use in making molded articles, the necessity for high mold temperatures and relatively long molding times is a disadvantage which is only partially compensated for by the exceptional rigidity and high heat distortion temperature of PET molding compositions.

Various attempts have been made to improve the molding properties of PET molding compositions. U.S. Pat. No. 4,086,212 and British Pat. No. 1,505,214, for instance, describe terephthalic copolyesters having a diol component which is mostly ethylene glycol, but which also contains codiols intended to modify the properties of the molding composition. The copolyesters of British Pat. No. 1,505,214 are said to crystallize considerably more rapidly than pure polyethylene terephthalate and to possess a very high melting point. Likewise, British published application No. 2,015,014 describes polyethylene terephthalate resin compositions containing selected low molecular weight organic esters of aromatic carboxylic acid, ketone, sulfone, sulfoxide, nitrile or amide for the purpose of improving the gloss of the molded product.

U.S. Pat. No. 3,565,852 describes PET molding compositions containing additional polyester of low polymer melt temperature such as polyneopentyl glycol terephthalate, polypentamethylene isophthalate, etc.

British Pat. No. 1,451,945, describes PET molding composition containing a variety of sulfonate salts including derivatives of alkali metal taurates and isethionates.

SUMMARY OF THE INVENTION

It is an object of the invention to provide an improved polyethylene terephthalate molding composition.

Molding composition of the invention comprises a blend of:

(a) at least about 40 wt % based on total molding composition of polyethylene terephthalate having an intrinsic viscosity of at least about 0.4 dl/g;
(b) between about 0.1 and about 15 wt % based on polyethylene terephthalate of aliphatic glycol phthalate polymer having a polymer melt temperature less than about 150° C. and a number average molecular weight of at least about 1000; and
(c) between about 0.5 and about 10 wt % based on polyethylene terephthalate of alkali metal taurate derivative of the formula

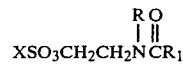

or alkali metal isethionate derivative of the formula

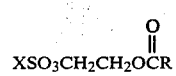

where X represents alkali metal,
R represents an alkyl radical having from 1 to about 8 carbon atoms or a cycloalkyl radical having from 3 to about 8 carbon atoms in the ring; and
$R_1$ represents fatty acid residue having from about 10 to about 18 carbon atoms.

DETAILED DESCRIPTION OF THE INVENTION

Molding composition of the invention comprises a blend of at least about 40 weight percent (wt %) PET with between about 0.1 and about 15 wt % based on PET of aliphatic glycol phthalate and between about 0.5 and about 10 wt % based on PET of alkali metal taurate derivative or alkali metal isethionate derivative or a mixture thereof.

Polyethylene terephthalate suitable for use in the invention has an intrinsic viscosity (IV) of between about 0.4 and about 1.5 deciliter per gram (dl/g) as measured in orthochlorophenol at 25° C. The PET can contain minor amounts of other comonomers such as diethylene glycol or glutaric acid. The PET may be prepared in a conventional manner such as by reaction of terephalic acid or its ester forming derivatives with ethylene glycol in a conventional polycondensation reaction.

Aliphatic glycol phthalate polymer suitable for use in the invention includes polymers of aliphatic glycol phthalates, isophthalates and terephthalates having polymer melt temperatures less than about 150° C. and intrinsic viscosities of at least about 0.1 dl/g. Such phthalate polymer is used in amounts between about 0.1 and about 15 wt % based on polyethylene terephthalate. Suitable phthalate polymers for use in the invention include, for instance, polymers of neopentyl glycol terephthalate, neopentyl glycol isophthalate, 1,4-butanediolphthalate, 1,4-butanediolisophthalate, the coester of 2,2-diethylpropane 1,3-diol with isophthalic acid; the polyester of 1,4-cyclohexane dimethanol with isophthalic acid; etc., and mixtures thereof. Copolyesters of such acids and from analog acids and glycols are also effective.

Phthalate polymer used in molding composition of the invention may be of any desired molecular weight. Polymer having number average molecular weight (Mn) between about 1,000 and about 10,000 will frequently be used.

Alkali metal taurate derivatives suitable for use in the invention are of the formula

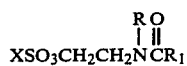

and alkali metal isethionate derivatives for use in the invention are of the formula

In both cases X represents alkali metal, R represents an alkyl radical having from 1 to about 8 carbon atoms or a cycloalkyl radical having from 3 to about 8 carbon atoms in the ring; and $R_1$ represents fatty acid residue having from about 10 to about 18 carbon atoms. Such taurate and/or isethionate derivatives are used in amounts between about 0.5 and about 10 wt % based on PET.

Isethionate and taurate derivatives suitable for use in compositions of the invention include for instance:
  coconut acid ester of sodium isethionate
  tall oil acid ester of sodium isethionate
  myristic acid ester of sodium isethionate
  lauric acid ester of sodium isethionate
  palmitoyl acid ester of sodium isethionate
  stearic acid ester of sodium isethionate
  myristoyl acid ester of potassium isethionate
  coconut acid ester of lithium isethionate
  coconut acid ester of potassium isethionate
  sodium N-methyl-N-oleoyl taurate
  sodium N-cyclohexyl-N-palmitoyl taurate
  sodium N-coconut acid-N-methyl taurate
  sodium N-methyl-N-tall oil acid taurate
  sodium N-methyl-N-myristoyl taurate
  sodium N-methyl-N-palmitoyl taurate
  potassium N-pentyl-N-stearic taurate
  potassium N-octyl-N-lauric taurate
  lithium N-cyclopropyl-N-oleoyl taurate
  lithium N-cyclooctyl-N-coconut acid taurate Low melting phthalate polyesters of the type described above for use in the invention may be prepared separately by conventional esterification or transesterification reactions and blended into the polyethylene terephthalate component by melt processing e.g. in an extruder.

While the invention may be practiced with respect to unreinforced molding compositions, it is strongly preferred that compositions of the invention include reinforcing fibers. Conventional thermally stable reinforcing fibers such as glass, asbestos, carbon, iron whiskers, etc., may, for instance, be used. Reinforcing fibers may be present in amounts between about 5 and about 60 wt % preferably between about 10 and about 50 wt %, based on total molding composition. Glass fibers having an average length of at least about 0.4 millimeter and diameters between about 5 and about 20 microns are especially preferred. Reinforcing fibers may be incorporated into the composition of the invention in any suitable manner, such as by compounding, extrusion with other ingredients of the compositions of the invention or by incorporation into the molding composition during injection molding of products from the compositions of the invention.

In addition to the thermally stable reinforcing fibers discussed above, compositions of the invention may also include inert, particulate filler materials in amounts up to about 40 wt % of the composition. Where both reinforcing fibers and particulate filler are used, the molding composition should not contain more than about 60 wt % total of such reinforcing fiber and filler.

Particulate filler suitable for use in the invention is usually in the form of particles in the general size range of between about 0.2 and about 20 microns and usually has aspect ratios less than about 5. Suitable materials include for instance such conventional fillers as glass spheres, clay, silica, silicates, alumina, etc. Compositions of the invention may also be alloyed with suitable amorphous thermally-stable resins such as polymethyl methacrylate, poly(ethyl acrylate-co-methyl methacrylate), polycarbonate, polysulfones, etc.

Compositions of the invention may also contain suitable flame-retardant additives in amounts up to about 20 wt % based on total composition and may contain relatively minor amounts of other materials which do not unduly affect the desired characteristics of the finished product. Such additional materials may, depending upon the particular compositions employed and products desired, include for instance, colorants, lubricants, plasticizers, stabilizers, etc. Where present such additional materials normally comprise no more than about 6 wt % of the total composition of finished product.

Impact modifiers may also be included in the compositions of the invention. Where used, such modifiers are preferably present in amounts between about 5 and about 30 wt % based on polyethylene terephthalate. Suitable impact modifiers include for instance the elastomeric materials described in U.S. Pat. Nos. 4,096,202; 4,034,013 and 3,835,098.

If desired, small amounts e.g. 0.1-10 wt % based on polymer of nucleating agent such as talc may be used. When used the total amount of nucleating agent plus reinforcing fiber and filler should not exceed about 60 wt % of the total weight of the molding composition.

Compositions of the invention have a number of advantages with respect to more conventional prior art compositions as exemplified by those described in the above mentioned patents. In particular, compositions of the invention are more easily processed in making molded articles, especially by injection molding, and injection molded articles can be made at higher molding speeds. In addition, articles molded from molding compositions of the invention have improved appearance and mechanical properties. Perhaps most importantly compositions of the invention have improved crystallization rates during the manufacture of injection molded articles and produce articles having improved heat distortion properties.

The data in the following example are intended to illustrate the invention without limiting the scope thereof.

EXAMPLE

Polyethylene terephthalate having an IV of 0.6 dl/g was made and dried in a conventional manner. Pellets of the dried PET were then melt blended in an extruder with various additives as shown in Table I below. This blending was accomplished at a melt temperature of 288° C. and 100 RPM. The thus formed molding compounds were then pelletized and dried for at least 4 hours. ASTM test specimens were then formed using a Van Dorn injection molding machine under the following conditions:

| Extruder temperature | 540–550° F. |
|---|---|
| RPM | 150 |
| Injection pressure | 1000 psi |
| Injection speed | 5 ft/min. |
| Mold temperature | 100° F. |

Mold cycle time as shown in Table I. The resulting test specimens were then evaluated for appearance and physical properties with the results shown in Table I.

TABLE I

| | RUN NO. | | | | | |
|---|---|---|---|---|---|---|
| | 1 | 2 | 3 | 4 | 5 | 6 |
| Ingredients | | | | | | |
| PET (IV 0.6 dl/g) | 70 | 70 | 70 | 70 | 70 | 70 |
| Glass fibers (3/16 inch) | 30 | 30 | 30 | 30 | 30 | 30 |
| Antioxidant (Irganox 1010) | 0.3 | 0.3 | 0.3 | 0.3 | 0.3 | 0.3 |
| Stabilizer (Epon 828) | 0.6 | 0.6 | 0.6 | 0.6 | 0.6 | 0.6 |
| Talc | 0.5 | 0.5 | 0.5 | 0.5 | 0.5 | 0.5 |
| Neopentyl glycol terephthalate polyester (Mn 3000) | — | 5.7 | — | — | 5.7 | 5.7 |
| Sodium-N—methyl-N—oleoyl taurate | — | — | 1.5 | — | 1.5 | — |
| Coconut ester of sodium isethionate | — | — | — | 1.5 | — | 1.5 |
| Results | | | | | | |
| Flexural modulus - psi (ASTM D790) | — | 26600 | 29800 | 30500 | 26800 | 27700 |
| Heat Distortion temperature at 66 psi - °C. (ASTM D648) | — | 97 | 242 | 242 | 241 | 241 |
| Heat distortion temperature at 264 psi - °C. (ASTM D648) | — | 77 | 87 | 87 | 85 | 84 |
| Izod impact, unnotched - ft. lb/in (ASTM D638) | — | 8 | 9 | 11 | 8 | 9 |
| Tensile strength - psi (ASTM D638) | — | 15000 | 18000 | 17400 | 15000 | 15500 |
| Elongation - % (ASTM D638) | — | 3.1 | 4.1 | 3.7 | 3.2 | 3.3 |
| Injection molding cycle time - seconds | | 15 | 25 | 20 | 20 | 20 |
| Sticking in mold | | yes | yes | yes | no | no |
| Part appearance and comments | clear, amorphous, too warped to test | uneven feed | amorp. edge poor surface | amorp. edge poor surface | OK | OK |

While the invention has been described above with respect to certain preferred embodiments thereof, it will be understood by those skilled in the art that various changes may be made without departing from the spirit or scope of the invention.

What is claimed is:

1. Polyethylene terephthalate molding composition comprising a blend of:
   (a) at least about 40 wt % based on total molding composition of polyethylene terephthalate having an intrinsic viscosity of at least about 0.4 dl/g;
   (b) between about 0.1 and about 15 wt % based on polyethylene terephthalate of aliphatic glycol phthalate polymer having a polymer melt temperature less than about 150° C. and a number average molecular weight of at least about 1000; and
   (c) between about 0.5 and about 10 wt % based on polyethylene terephthalate of alkali metal taurate derivative of the formula

or alkali metal isethionate derivative of the formula:

$$XSO_3CH_2CH_2OCR$$
$$\overset{O}{\underset{\|}{}}$$

where X represents alkali metal,
R represents an alkyl radical having from 1 to about 8 carbon atoms or a cycloalkyl radical having from 3 to about 8 carbon atoms in the ring; and
$R_1$ represents fatty acid residue having from about 10 to about 18 carbon atoms.

2. Molding composition according to claim 1 which also contains between about 10 and about 60 wt % based on total composition of thermally stable reinforcing fibers.

3. Molding composition according to claim 2 wherein the reinforcing fibers comprise glass fibers.

4. Molding composition according to claim 2 wherein the alkali metal is sodium.

5. Molding composition according to claim 4 wherein the phthalate is neopentyl glycol terephthalate.

6. Molding composition according to claim 5 which contains between about 0.5 and about 10 wt % based on polyethylene terephthalate of sodium-N-methyl-N-oleoyl taurate.

7. Molding composition according to claim 5 which contains between about 0.5 and about 10 wt % based on polyethylene terephthalate of coconut ester of sodium isethionate.

8. A molded article made from the molding composition of claim 1.

* * * * *